(12) United States Patent
Broyles et al.

(10) Patent No.: US 7,142,868 B1
(45) Date of Patent: Nov. 28, 2006

(54) METHOD AND SYSTEM FOR PREDICTING WIRELESS COMMUNICATION SYSTEM TRAFFIC

(75) Inventors: Dan Broyles, Olathe, KS (US); Jeff Cox, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 500 days.

(21) Appl. No.: 10/127,225

(22) Filed: Apr. 22, 2002

(51) Int. Cl.
*H04Q 7/20* (2006.01)

(52) U.S. Cl. .................... 455/453; 455/446; 455/423; 455/418

(58) Field of Classification Search ............. 455/429, 455/446, 453, 418–420, 422.1, 423, 447, 455/449, 450–452.2, 67.11
See application file for complete search history.

(56) References Cited

U.S. PATENT DOCUMENTS

| 5,463,673 | A | | 10/1995 | Herscovici | 379/59 |
| 5,594,940 | A | * | 1/1997 | Peterson et al. | 455/429 |
| 5,828,962 | A | | 10/1998 | Ho-A-Chuck | 455/446 |
| 6,011,786 | A | * | 1/2000 | Dent | 370/330 |
| 6,246,880 | B1 | * | 6/2001 | Iizuka | 455/446 |
| 6,253,065 | B1 | | 6/2001 | Palmer | 455/67.3 |
| 6,308,071 | B1 | * | 10/2001 | Kalev | 455/446 |
| 6,539,221 | B1 | * | 3/2003 | Vasudevan et al. | 455/423 |
| 6,647,275 | B1 | * | 11/2003 | Kobernat | 455/453 |
| 6,725,263 | B1 | * | 4/2004 | Torres | 709/223 |
| 6,985,839 | B1 | * | 1/2006 | Motamedi et al. | 455/422.1 |
| 6,999,766 | B1 | * | 2/2006 | Padovani | 455/437 |
| 2004/0214583 | A1 | * | 10/2004 | Graham et al. | 455/453 |
| 2005/0135313 | A1 | * | 6/2005 | Gandhi et al. | 370/335 |

FOREIGN PATENT DOCUMENTS

GB 2265525 9/1993

OTHER PUBLICATIONS

Ssangyong Information & Communications Corp., *PCS Cell Planning System*, http://www.sicc.co.kr/ENG/business/pcs.htm, 1998, pp. 1-3.
Cox Associates, *Reducing Network Costs while maintaining and improving reliability*, http://cox-associates.com/NetOpt.htm, pp. 1-3.

* cited by examiner

*Primary Examiner*—Joseph Feild
*Assistant Examiner*—Kamran Afshar

(57) ABSTRACT

A method and system for predicting wireless communication system traffic is provided. Inputs, such as current wireless system traffic and expected future market traffic, are input into a system. The system can use the expected future market traffic to extrapolate from the current wireless system traffic to establish a future expected wireless system traffic estimation. The system may also identify capacity problems within the future expected wireless system due to unbalanced traffic loading or overloading of traffic within the future expected wireless system.

20 Claims, 7 Drawing Sheets

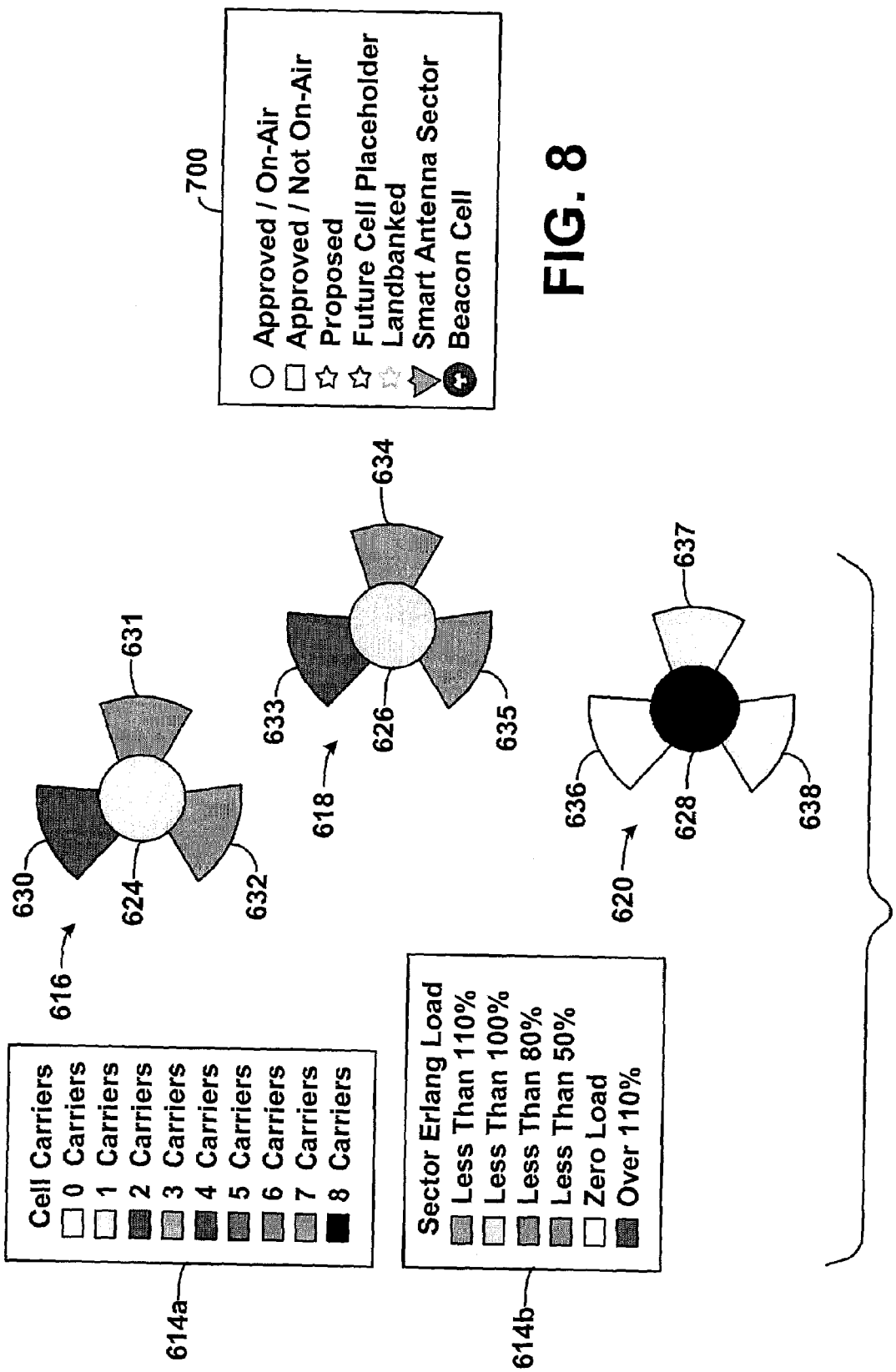

METHOD AND SYSTEM FOR PREDICTING WIRELESS COMMUNICATION SYSTEM TRAFFIC

BACKGROUND

A. Field of Invention

The present invention relates to wireless systems, and more particularly, to a system and method for predicting wireless network traffic.

B. Description of Related Art

Wireless systems, such as cellular wireless systems or personal communication systems (PCS), are growing due to an increase of mobile subscribers. Worldwide public demand, availability of cost-effective technology, and recent regulatory actions have all contributed to this growth of wireless telecommunications. With an increase in telecommunications traffic, infrastructures of cellular wireless systems may need to be reconfigured.

The infrastructure of a cellular wireless system may be reconfigured in many ways, such as by reallocating resources, reconfiguring cell sites, or by adding wireless communication equipment, such as a base transceiver station (BTS), a base station controller (BSC), or additional antennas for a BTS. Many factors must be considered for allocating wireless communication equipment, such as availability of base station sites, available telecommunication traffic capacity at each base station, and wireless service quality at various high telecommunication traffic areas.

Each cell site of a wireless system has a BTS, which typically consists of a tower, antennas, and a small building containing radio equipment. The antennas provide a radiation pattern that defines a coverage area, which has sectors that define regions of wireless signal coverage. The coverage area of a BTS may be reconfigured as well to provide service to additional areas. In addition, an increase in cell sites may be necessary to support an increase in wireless telecommunication traffic. New cell sites may be necessary in rural areas, whereas existing wireless cell sites may require cell site splitting in urban areas.

Cell sites can be allocated in a manner such that a large percentage of mobile station subscribers can obtain a sufficient signal strength to achieve an acceptable quality of service (QoS). QoS can be affected by many factors including transmission path obstruction, cell site overlap (e.g., 15 percent is normal), and system redundancy. The maximum distance that a mobile station can be located from a cell site while still achieving acceptable service reliability should also be considered. Several network parameters may be analyzed to determine such a distance including carrier-to-noise ratios (CNRs), self-repeat site interference, and/or fade margins.

In planning a wireless system, call models and subscriber forecasts may dictate expected growth of telecommunication usage. Wireless system planning tools available today focus primarily on optimizing a present wireless system, or locating optimal positions for a new cell site. Such tools cannot predict future capacity problems and/or estimate future telecommunication traffic on a wireless system.

Typically, design and implementation of a new cell site requires a substantial period of time. Implementation requires selecting a suitable location for the cell site, obtaining city permits and approvals, constructing the cell site, creating backhaul circuits for the cell site, and testing the cell site. A capacity problem may arise prior to completion of the new cell site. Therefore, planning for future capacity problems in a wireless network may be desirable in order to implement new cell sites before a capacity problem occurs.

SUMMARY

In one aspect, a method and system of predicting wireless communication system traffic is provided. Generally speaking, a computer system receives parameters indicative of current network configuration, such as locations of network components and measures of air interface and switch traffic throughout the network. Based on those parameters, the system may then display a graphical representation of the current network configuration on a graphical user interface (GUI) on a computer screen.

In another aspect, the computer system receives parameters indicative of capacity demands in the future, such as expected levels of traffic and expected changes in a market (such as population growth for instance). The computer system may categorize the parameters according to market and cell site growth level groups. Also, the system may receive a user selection of a date or time in the future. The system may then use the information about future capacity demands to extrapolate from the current network configuration, so as to determine what the network configuration may need to be at the selected future date or time. And the system may then display a graphical representation of that future expected network configuration. In addition, the system may also determine problems within the future expected network configuration and depict those problems graphically on the display of the future expected network configuration.

These as well as other features and advantages of the present invention will become apparent to those of ordinary skill in the art by reading the following detailed description, with appropriate reference to the accompanying drawings.

BRIEF DESCRIPTION OF FIGURES

Presently preferred embodiments of the invention are described below in conjunction with the appended drawing figures, wherein like reference numerals refer to like elements in the various figures, and wherein:

FIGS. 7–8 illustrate components of the graphical representation of FIG. 6.

DETAILED DESCRIPTION OF EXEMPLARY EMBODIMENTS

Figure 1:
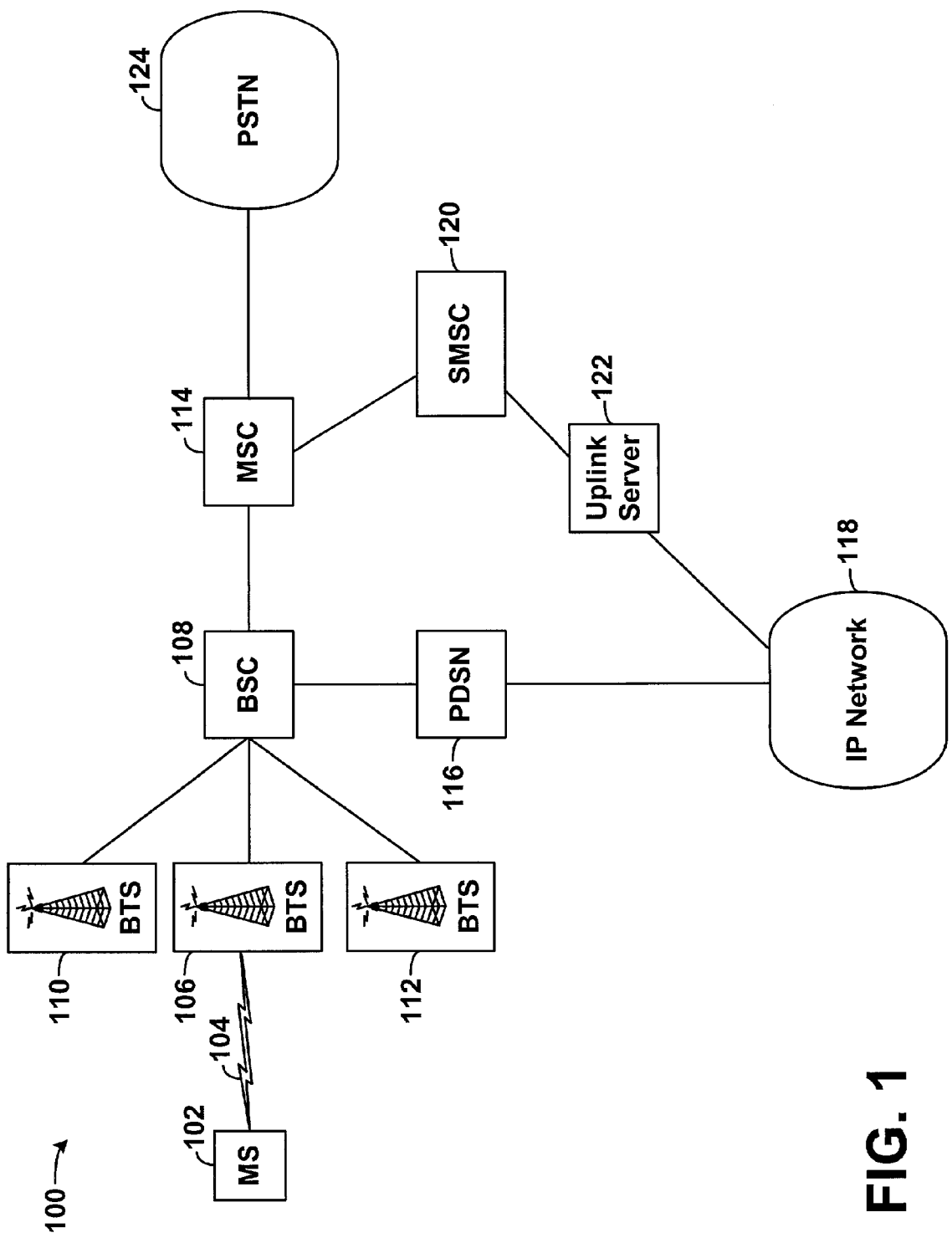
FIG. 1 illustrates one embodiment of a block diagram of a wireless communication system.

In accordance with an exemplary embodiment, a method and system for managing capacity in a wireless communication system, such as a cellular communication network for instance, is desired. Referring to FIG. 1, a block diagram illustrating a wireless communication system 100 is provided. It should be understood that this and other arrangements described herein are set forth for purposes of example only, and other arrangements and elements can be used instead and some elements may be omitted altogether. Further, as in most telecommunications applications, those skilled in the art will appreciate that many of the elements described herein are functional entities that may be implemented as hardware, firmware and/or software, and as discrete components or in conjunction with other components, in any suitable combination and location.

By way of example, the wireless communication system 100 is shown to include a mobile station (MS) 102 in communication via an air interface 104 with a base transceiver station (BTS) 106, which is coupled to a base station controller (BSC) 108. Mobile stations including cellular telephones, personal digital assistants (PDA), wireless modems, or other mobile nodes may be used in accordance with the wireless communication system 100. BTS 106 includes one or more antenna elements arranged to produce radiation patterns defining one or more sectors. Additional BTSs 110, 112 coupled to BSC 108 are also illustrated. Although three BTSs are illustrated within FIG. 1, it will be understood that more or fewer BTSs may be present within the wireless communication system 100. BSC 108 is an interface between BTSs 106, 110, 112 and a mobile switching center (MSC) 114. BSC 108 also handles radio resource management and radio network management functions for BTSs 106, 110, and 112.

In this example, BSC 108 is coupled to MSC 114. BSC 108 is also coupled to a packet data service node (PDSN) 116, which provides connectivity to an Internet protocol (IP) network 118. In another embodiment, BSC 108 may be omitted altogether, and the MSC 114 may be coupled to the BTSs 106, 110, and 112. MSC 114 is coupled to the IP network 118 through a short message service center (SMSC) 120 and an uplink server 122. MSC 114 is also coupled to the public switched telephone network (PSTN) 124. MSC 114 performs signaling functions to establish wireless connections between the MS 102 and the IP network 118 and the PSTN 124. MSC 114 also allows connectivity to multiple switching platforms. SMSC 120 provides telephony services such as electronic messaging, digital paging, voice mail notification, and other services. In addition, SMSC 120 may provide subscription information delivery services, such as broadcast stock quotes, sports scores, or weather updates. Each of the couplings of the wireless communication system 100, excluding the air interface 104, may be interfaces such as a trunk level 1 (T1) line, an Ethernet line, a signaling link, or other connections.

The BTSs illustrated in system 100 may be divided geographically into a number of cell sites, each defined by a radio frequency (RF) radiation pattern from respective BTS antennas. The cell sites may be further divided geographically into a number of sectors, each defined respectively by radiation patterns from directional antennas of the respective BTS. The radiation pattern defining the sector usually includes a beam width of 120°. However, any beam width may be used, and any number of sectors may be employed with BTSs 106, 110, and 112. Sectors can be referred to as "physical sectors," since they are physical areas of a cell site. Therefore, at any given instant, an MS in the wireless system 100 will typically be in a given sector and will be able to communicate with the IP network 118 or the PSTN 124 via the BTS serving that sector.

The sectors of a BTS define the coverage area of the BTS. The coverage area may be the maximum distance that a mobile station can be located from a BTS while still achieving acceptable wireless signal transmission. BTSs are allocated throughout an area in a manner such that a mobile station may travel through the area without losing a signal. For instance, as a mobile station moves from one cell site to another in a wireless communication system, the serving BTS changes periodically. Each changeover is known as a handoff, which enables the mobile station to maintain an acceptable wireless signal channel.

Figure 2:
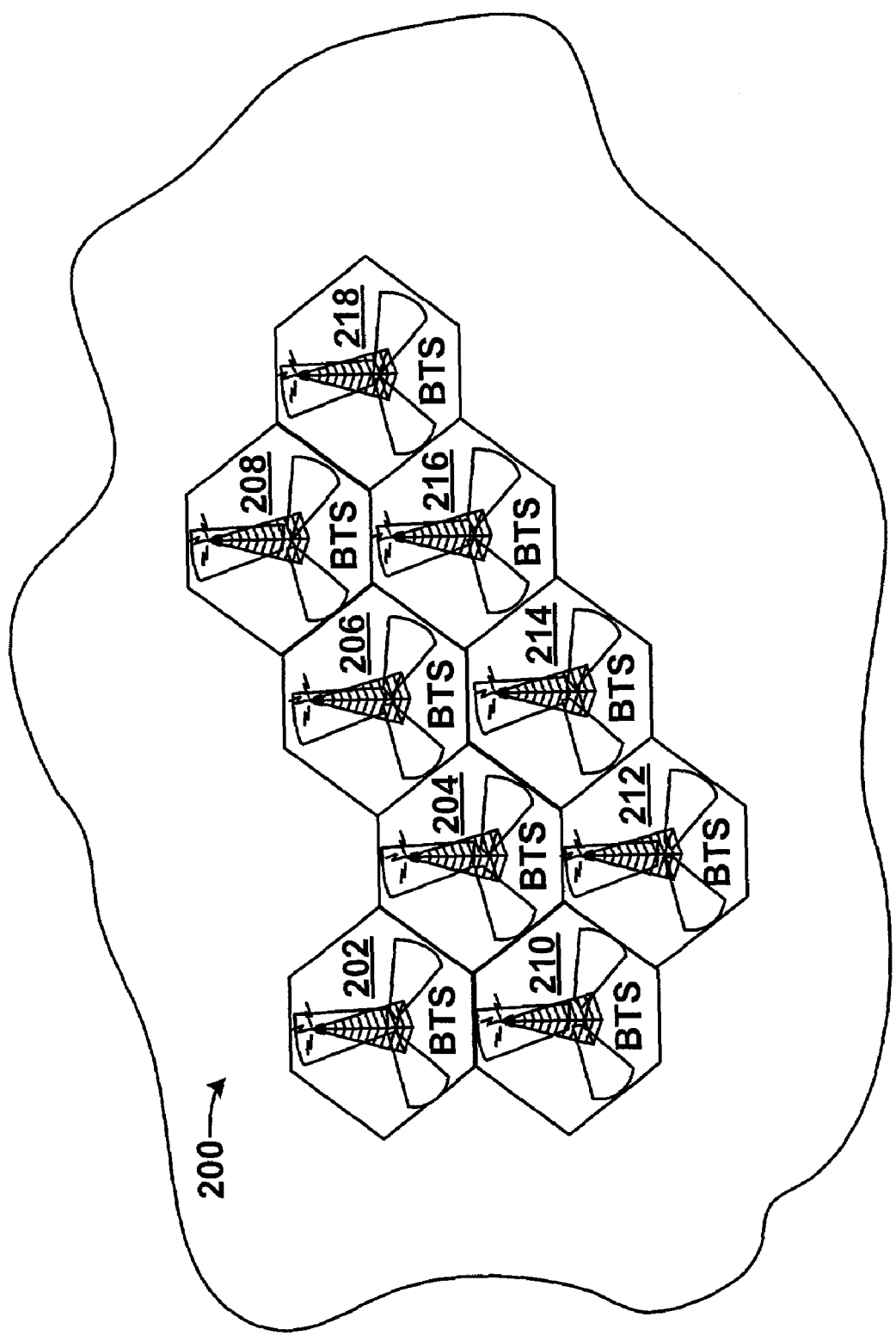
FIG. 2 illustrates one embodiment of a conceptual cell site configuration.

An example conceptual cell site configuration 200 is illustrated in FIG. 2. The cell site configuration 200 includes BTSs having coverage areas 202, 204, 206, 208, 210, 212, 214, 216, and 218. Each coverage area may be modeled as a hexagon. BTSs may be positioned throughout an area in a manner such that each hexagon abuts another, although overlap may also exist to provide a higher quality of service. Alternatively, BTSs may be positioned further apart from one another in order to provide wireless services to a larger area. An MS may travel through the cell site configuration 200 and communicate with each BTS or only a portion of the BTSs within the configuration 200.

Communications between an MS and a BTS may include voice communications and data communications. As used herein, voice communications may refer to Erlang traffic and/or voice traffic, and data communications may refer to throughput traffic and/or data traffic. Erlang traffic is a measurement of telephone conversation traffic where one Erlang is equal to one full hour of conversation. Erlang traffic can also include measurements of throughput/data traffic. Throughput traffic is a function of bandwidth, error performance, congestion, and other factors, and is associated with data transmission.

Existing wireless communication networks may have inadequate and/or over-loaded coverage areas in certain geographic areas or under-loaded coverage in other geographic areas. As more mobile stations enter into a wireless communication system, more BTSs may be installed in a given region, and adequate coverage and service can be obtained. Alternatively, voice and data traffic may be reallocated to under-loaded BTS cell sites.

Figure 3:
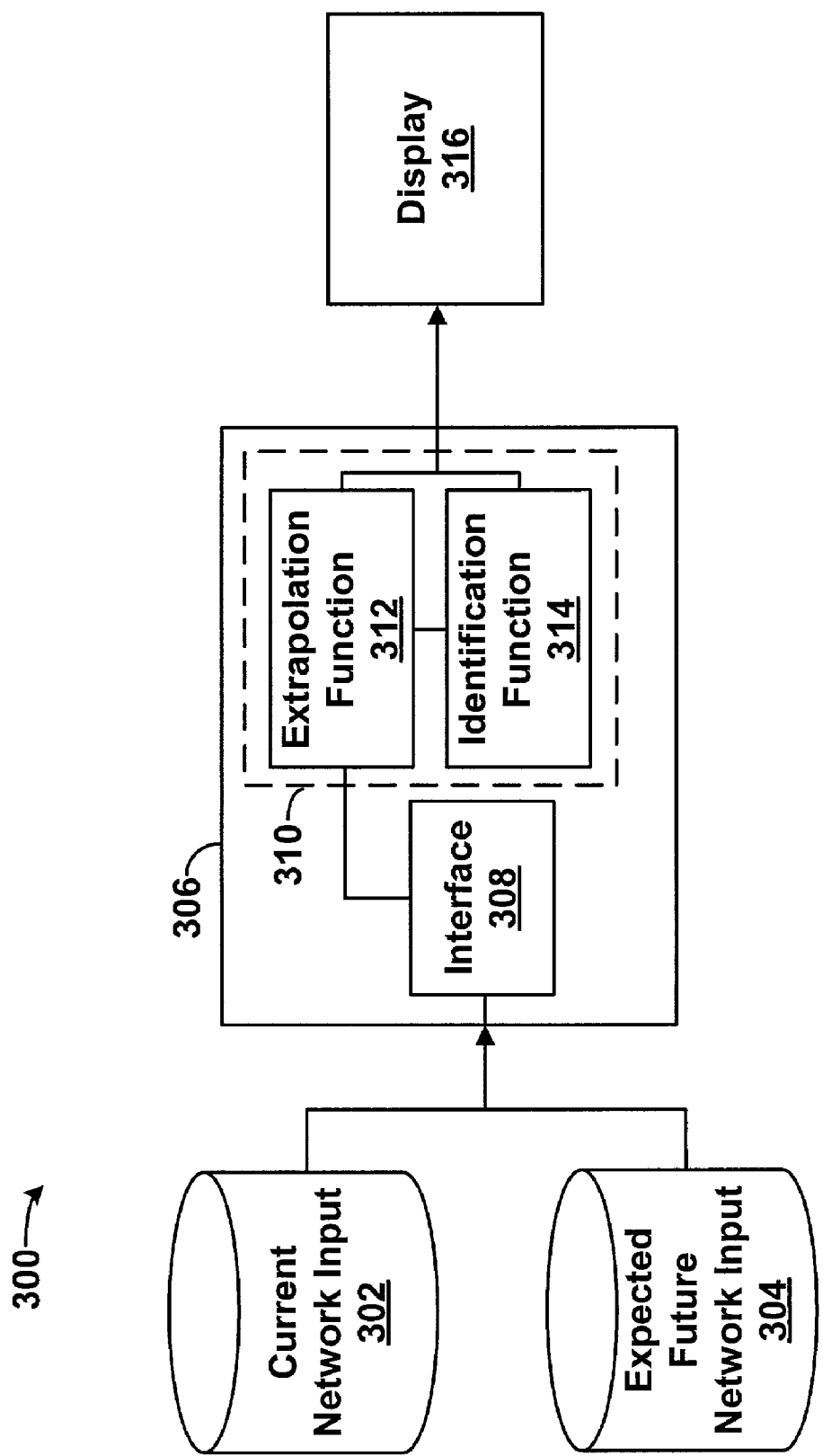
FIG. 3 illustrates one embodiment of a system.

FIG. 3 illustrates one embodiment of a system 300 to plan a configuration of a wireless communication system. System 300 may include current network input(s) 302, expected future network input(s) 304, a computer 306, and a display 316. The current network input(s) 302 and the expected future network input(s) 304 are input into the computer 306 through an interface 308. The interface 308 may be a standard keyboard, however other interfaces may also be used. The computer 306 also contains a processing unit 310 which may perform an extrapolation function 312 and an identification of capacity problem function 314. The computer 306 outputs a graphical representation of the network on the display 316. The display 316 may be a standard computer screen or other displays.

Functionality of the computer 306 illustrated in FIG. 3 may be provided using software with object-oriented machine language instructions and techniques, such as the C++ programming language. However, other programming languages such as the C programming language could be used as well.

The computer 306 may receive the inputs 302, 304 using a graphical user interface (GUI). Other operating environments may be used as well that have the processing unit 310, and possibly a memory system. The operating environment may be any suitable commercially available embedded or disk-based operating system, or any proprietary operating system. The processing unit 310 may consist of one or more smaller processing units, including, for example, a programmable digital signal processing engine. The processing unit 310 may also be implemented as a single application specific integrated circuit (ASIC) to improve speed and to economize space. The processing unit 310 may perform acts and operations referred to as being "computer executed" or "CPU executed." The processing unit 310 may be executable to perform functions to operate a system that has communications software, firmware, or hardware for implementing various functions of the computer system.

Storage (not illustrated) may also be included within the computer 306 and may include main memory and secondary storage. The main memory may include random access memory (RAM). Main memory can also include any additional or alternative memory device or memory circuitry. Secondary storage can be provided as well and may be persistent long term storage, such as read only memory (ROM), optical or magnetic disks, organic memory, compact-disc read only memory (CD-ROM), or any other volatile or non-volatile mass storage systems.

Figure 4:
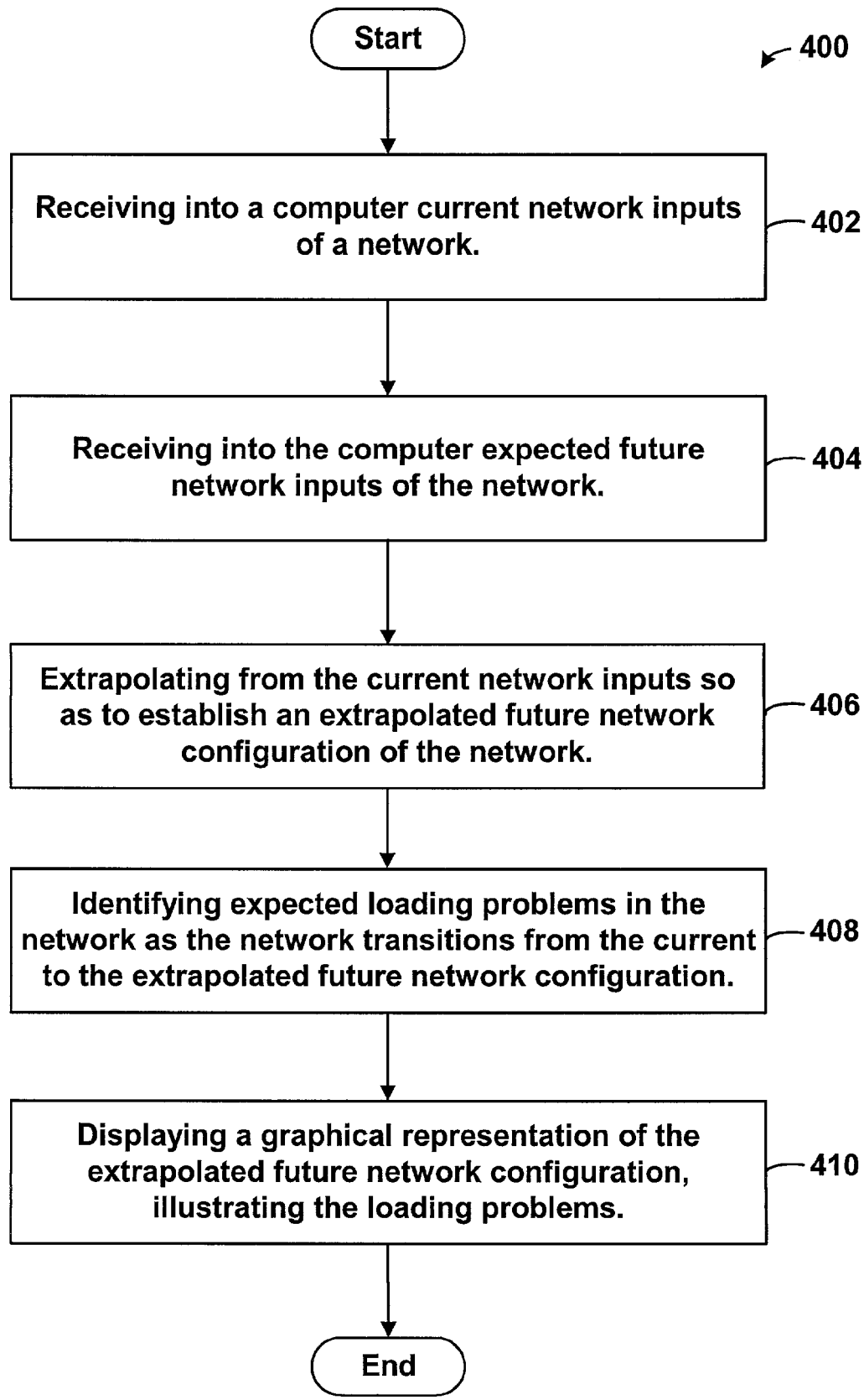
FIG. 4 illustrates a flowchart depicting functional blocks of a method according to one embodiment.

According to an exemplary embodiment, a method 400 for managing traffic in a wireless communication network is illustrated in FIG. 4. The method 400 may involve the following, each of which is described in the sections below: (i) the computer 306 may receive current network inputs 302 of a network as shown at block 402; (ii) the computer 306 may also receive expected future network inputs 304 of the network as shown at block 404; (iii) using the expected future market inputs 304, the computer 306 may extrapolate from the current network inputs 302 so as to establish an extrapolated future network configuration of the network as shown at block 406; (iv) the computer 306 may identify expected loading problems that will arise in the network as the network transitions from the current network inputs 302 to the extrapolated future network configuration as shown at block 408; and (v) the computer 306 may display a graphical representation of the extrapolated future network configuration as shown at block 410, including in the graphical representation indicia of the expected loading problems.

As shown at block 402, the computer 306 receives current network inputs 302. Current network inputs 302 may include current network traffic information and can be determined according to present demands and performances of cell sites. In this regard, criteria may include number of sectors per cell site, number of carriers per cell site, and amount of current sector traffic or current cell site traffic, for instance. For example, sector traffic inputs may include Erlang traffic during a cell site high traffic time period, Erlang traffic during MSC or switch high traffic time period, throughput traffic, and other traffic inputs. Network information may include both voice and data traffic, and may be input per-sector or per-cell site. The input may take the form of a table per market, indicating average values of network traffic capacity demands on each cell site in each market. A market may include geographic areas such as a city, a suburb, and/or portions of a city or a suburb.

As indicated at block 404, the computer 306 receives expected future network inputs 304. Expected future network inputs 304 can be determined from network forecasts or estimations which include: (i) how many subscribers are in a market, (ii) total Erlangs used per subscriber during busy hour, (iii) total amount of 2G data (i.e., percentage of subscribers which use 2G data transmission), (iv) total amount of 3G data (i.e., percentage of subscribers which use 3G data transmission), and others, all of which are date bound.

In addition, classification information may be entered by a user into the computer 306 as well and used to establish the extrapolated future network configuration. The classification information may be characterized as morphology settings.

For instance, cell sites may be classified into groups of growth categories due to location and past performance. The classifications (e.g., morphology settings) may be based upon anticipated usage of the cell site as well. For example, if a shopping mall is to be built in an area in which three cell sites are currently present, the amount of traffic on the three cell sites can be expected to increase substantially due to an anticipated increase in population from the shopping mall. Thus, the three cell sites may be classified as high growth cell sites.

As another example, urban areas may have high population growth, and therefore may have a high voice traffic growth. As such, a cell site in an urban area can be characterized as a high traffic growth cell site. Example classifications or morphologies include low, medium, and high, having example growth rate percentages of 4%, 6%, and 8%. Any number of morphology groups may be used to further classify and provide distinctions between cell sites of a wireless communication system.

After inputting the current and expected future network information, a user of the computer 306 then selects a future date (or relative offset date) to observe the effects of the inputs on the current network at the future date. The computer 306 then retrieves the inputs according to the selected date and extrapolates from the expected sector traffic and morphology configurations from current sector traffic information at the selected date to establish an expected future network configuration, as shown at block 408 in FIG. 4.

The user can also observe the wireless communication network at various time periods in the future. For example, a first iteration may include a current model of a present wireless communication system in use, while second and third iterations may include models of the wireless communication system two or three years into the future. Multiple iterations may also be viewed to display changes to the wireless communication network.

As telecommunication traffic capacity problems appear, the user may interact with the computer 306 to eliminate these potential problems. For instance, the user may add carriers to a BTS, add BTSs, offload neighboring sectors, add sectors, pool carriers together, upgrade to smart antennas in order to modify the graphical representation of the network to establish a plan to eliminate capacity problems.

In one embodiment, extrapolation of future expected traffic may be completed by totaling current voice and data traffic on all cell sites and categorizing the cell sites into groups based on the expected growth rate of traffic within the cell sites. The expected future market traffic may then be distributed among the groups based on the growth rates of the groups, and within each group, the expected future market traffic may be distributed among the sectors of each cell site.

In another embodiment, extrapolation is completed by dividing the expected future market traffic into market-growth level groups, such as expected traffic level groups. For example, a high traffic level group may be established including cell sites that are expected to have a large increase in voice and data traffic. Similarly, sectors of the cell sites may be assigned into sector-growth level groups. Each sector-growth level group may define a traffic growth rate, which corresponds to one of the market-growth level groups. An expected growth scaling factor can be computed using the sector and market growth level groups and applied to the sector-growth level groups to compute expected future growth rates for each of the sector-growth level groups. The growth scaling factor may be computed using a "conservation of Erlang" algorithm described below. The expected future growth rates can be applied to the current per-sector traffic of each of the sectors of the cell sites to establish expected future per-sector traffic.

The growth estimation function known as the "conservation of Erlang" algorithm may be applied to determine a growth rate of cell sites. An expected future amount of market voice and data traffic is known, and input into the algorithm to allow a user to apply the expected traffic proportionately to cells with different classifications or morphologies. For example, a large traffic increase may be allocated to a cell site with a high estimated growth and a lower traffic increase may be allocated to a cell site with a low estimated growth. The algorithm ensures that a total expected growth increase fulfills expected traffic demands for a market, and also ensures that the increase does not exceed the traffic demands.

In general, the conservation of Erlang algorithm may determine a percentage of Erlang traffic (both voice and data traffic) by which a cell site can expect to increase or decrease. The conservation of Erlang algorithm may estimate total expected Erlang traffic, allocate the Erlang traffic into groups correlating to previous traffic levels of cell sites, establish a growth rate of each group based on previous growth in traffic of the cell sites, and determine a percentage increase or decrease of Erlang traffic that is expected for a cell site within each group. The conservation of Erlang algorithm is a method for weighting the distribution of change in traffic. The conservation of Erlang algorithm assigns a growth rate to cell sites in relation to one another and in relation to an expected increase of Erlang traffic on each cell site.

An example of a conservation of Erlang algorithm is shown below (Equation 1). Total expected Erlang traffic is determined and divided (or allocated) into market level growth groups such as low, medium, and high Erlangs. A low, medium and high Erlang growth rate is also established based on previous growth performances. For example, sectors that have a history of growing between 3% and 5% per month may be grouped into one morphology with a growth rate of 4%. Finally, a percentage of Erlang traffic that a cell site within each group can expect to change is determined by solving the algorithm provided below.

$$(1 + LowGrowth \times X) \times TotalLow + $$
$$(1 + MediumGrowth \times X) \times TotalMedium + $$
$$(1 + HighGrowth \times X) \times TotalHigh = $$
$$TotalExpectedFutureMarketTraffic$$

Equation 1

Where:
- $X$ is a scaling factor for sector traffic;
- LowGrowth is a coefficient associated with a low morphology (i.e., a low growth rate);
- MediumGrowth is a coefficient associated with a medium morphology (i.e., a medium growth rate);
- HighGrowth is a coefficient associated with a high morphology (i.e., a high growth rate);
- TotalLow is an amount of the current market traffic allocated for low growth cell sites (i.e., market level group low);
- TotalMedium is an amount of the current market traffic allocated for medium growth cell sites (i.e., market level group medium);
- TotalHigh is an amount of the current market traffic allocated for high growth cell sites (i.e., market level group high); and
- TotalExpectedFutureMarketTraffic is the expected market traffic input.

Equation 1 may be solved for the scaling factor, X, that is applied to the LowGrowth, MediumGrowth, and HighGrowth coefficients to establish an expected percentage increase of Erlang traffic for the cell sites. TotalLow, TotalMedium, and TotalHigh are each values that are obtained from a present Erlang loading of the wireless communication network, and each may be determined from a division of the current network information according to the sector-growth level groups.

As an example, a system may have three cell sites, cell sites A–C, each characterized in a respective morphology. The system may be expected to support 100 Erlangs of traffic at a future date. Each cell site may presently support 20 Erlangs of traffic. In addition, cell site A may have had a 5% increase in traffic from the previous year, cell site B may have had a 10% increase, and cell site C may have had a 20% increase. Accordingly, setting LowGrowth to 5%, MediumGrowth to 10%, and HighGrowth to 20% and each of TotalLow, TotalMedium, and TotalHigh to 20 Erlangs and solving Equation 1 for X results in a scaling factor of X=5.72.

The scaling factor may then be applied to each of the sector-growth level groups (i.e., morphology) to compute expected future growth rates as shown below in Table 1.

TABLE 1

| Morphology | Equation | Percentage Increase |
|---|---|---|
| Low | (1 + 0.05 × 5.72) | 28.6% |
| Medium | (1 + 0.1 × 5.72) | 57.2% |
| High | (1 + 0.2 × 5.72) | 114% |

From Table 1, an estimate for future Erlang and data traffic on a cell site can be predicted. For example, cell site A presently supporting 20 Erlangs may have to support approximately 26 Erlangs (i.e., 20×28.6% increase=25.72) at the future date due to the expected percentage increase of traffic. By the same result, cell site B may have to support approximately 32 Erlangs (i.e., 20×57.2% increase=31.44), and cell site C may have to support approximately 43 Erlangs (i.e., 20×114% increase=42.88) at the future date. Cell site C may have to support a larger percentage of the expected Erlang traffic (i.e., 100 total Erlangs at the future date) due to the morphology characterization of cell site C from the large increase of Erlang traffic in the past on cell site C. The conservation of Erlang algorithm ensures that substantially all expected Erlang traffic will be accounted for and distributed proportionately between cell sites A–C. For instance, in this example, 100 Erlangs of traffic were expected on the system that has cell sites A–C. A prediction was made that cell sites A–C would support approximately 26, 32, and 43 Erlangs respectively. Therefore, substantially all of the expected Erlang traffic was accounted for and distributed (i.e., 26+32+43=101 Erlangs).

The computer 306 may also identify a current and/or expected percentage of cell site loading, which can illustrate current and/or future capacity problems due to cell overloading. The current percentage of cell site loading may be determined according to Equation 2 provided below, and the future expected percentage of cell site loading may be determined according to Equation 3 provided below.

$$\frac{CurrentTraffic}{CapacityofCellsite} \times 100 = \% \ of cellsite loading \quad \text{Equation 2}$$

$$\frac{ExpectedTraffic}{CapacityofCellsite} \times 100 = \% \ of cellsite loading \quad \text{Equation 3}$$

Where:

CurrentTraffic is the current network input 402;

ExpectedTraffic is the expected future network input 404;

CapacityofCellsite is an estimated or measured maximum amount of voice and data traffic that a cell site can support; and % ofcellsiteloading is a proportion of the cell site capacity that is filled.

The percentage of cell site loading allows a user to determine which cell sites have capacity problems and which cell sites have excess capacity.

In one embodiment, capacity of a cell site is based upon measurements in the field. For example, a three sector cell site having one carrier may support 20 Erlangs, and this can be determined according to a measurement of wireless signals received and transmitted. In another embodiment, capacity of a cell site may be determined according to types of service. For example, as technology improves, the capacity of a cell site may also improve. A carrier may currently employ a second generation CDMA standard (i.e., 2G CDMA). However, in the future, the cell site may employ a third generation CDMA standard (i.e., 3G CDMA). The third generation CDMA standard may improve performance of transmission and reception. Thus, current and/or future capacity of a cell site may be determined by calculating a maximum number of Erlangs that a carrier can support due to a technology employed, and multiplying the maximum number of Erlangs by the number of carriers on a given cell site.

Referring to FIG. 3, the computer 306 may display the graphical representation of the current network configuration and/or the future network configuration on a display 316 such as a computer screen using a GUI. The computer may use a GUI such as the imPACT RF software package available from Sprint Spectrum L.P., of Overland Park, Kans. Other interfaces may be used as well, such as an interface operable in accordance with the Windows® operating system. The computer 306 illustrates the network at the selected future date by loading the extrapolated future network configuration according to the selected date. Each cell site can be illustrated with an amount of Erlang traffic according to the calculated amount of traffic that will be present on each cell at the selected date.

The computer 306 also can display capacity/loading problems within the extrapolated future network configuration by using different colors and shapes to illustrate traffic and capacity loading problems. For example, a cell site can be illustrated with three sectors. Each sector may be color-coded according to sector traffic capacity. For instance, a red sector may refer to an over-loaded sector, while a white sector may refer to a sector with no load. The computer 406 can also locate a cell site that has the largest expected overload within the network and display a percentage of overloading on the cell site.

Figure 5:
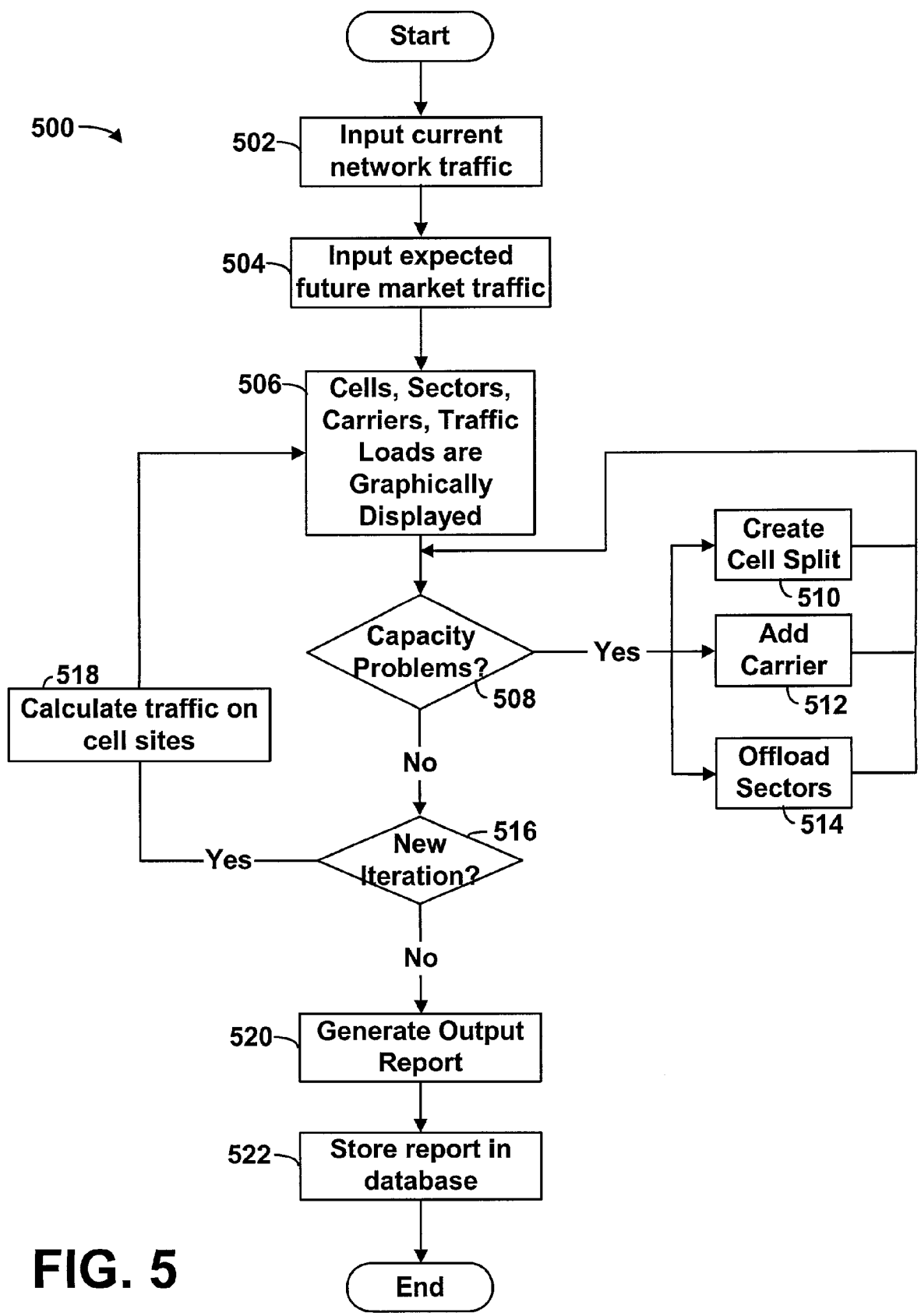
FIG. 5 illustrates a flowchart depicting functional blocks of a method according to one embodiment.

FIG. 5 illustrates one embodiment of a method 500 to present the graphical representation of the network on a display. Initially, the inputs according to current network traffic and expected future network traffic are entered into a computer as shown at blocks 502 and 504. The inputs may be retrieved from a database connected to a computer or entered by a user. The computer may then graphically display the wireless communications network including individual cell sites, carriers per-cell site, sectors per-cell site, and traffic per-cell site and/or per-sector as shown at block 506. The computer may then check for traffic capacity problems within the network as shown at block 508, and if capacity problems are present, the user may eliminate the problems by modifying the wireless network configuration display. Example modifications include splitting cell site coverage areas 510, adding a carrier to a cell site 512, and/or offloading sectors of a cell site 514. The computer may check for capacity problems by comparing the future capacity inputs with expected future traffic.

The user may then select a new future date or iteration as shown at block 516, to observe the effects of the modifications and/or observe the effect of the expected future market traffic. If a new iteration is generated, the computer may then re-calculate traffic on each individual cell site as shown at block 518. Otherwise, the computer may generate an output report and store the report in a database as shown at blocks 520 and 522.

The graphical representations of the wireless network may include various wireless communication equipment, such as a BTS, BSC, or other entities superimposed over a geographic map containing cities and/or highways. The display may include Erlang and data traffic capacity of each BTS.

Figure 6:
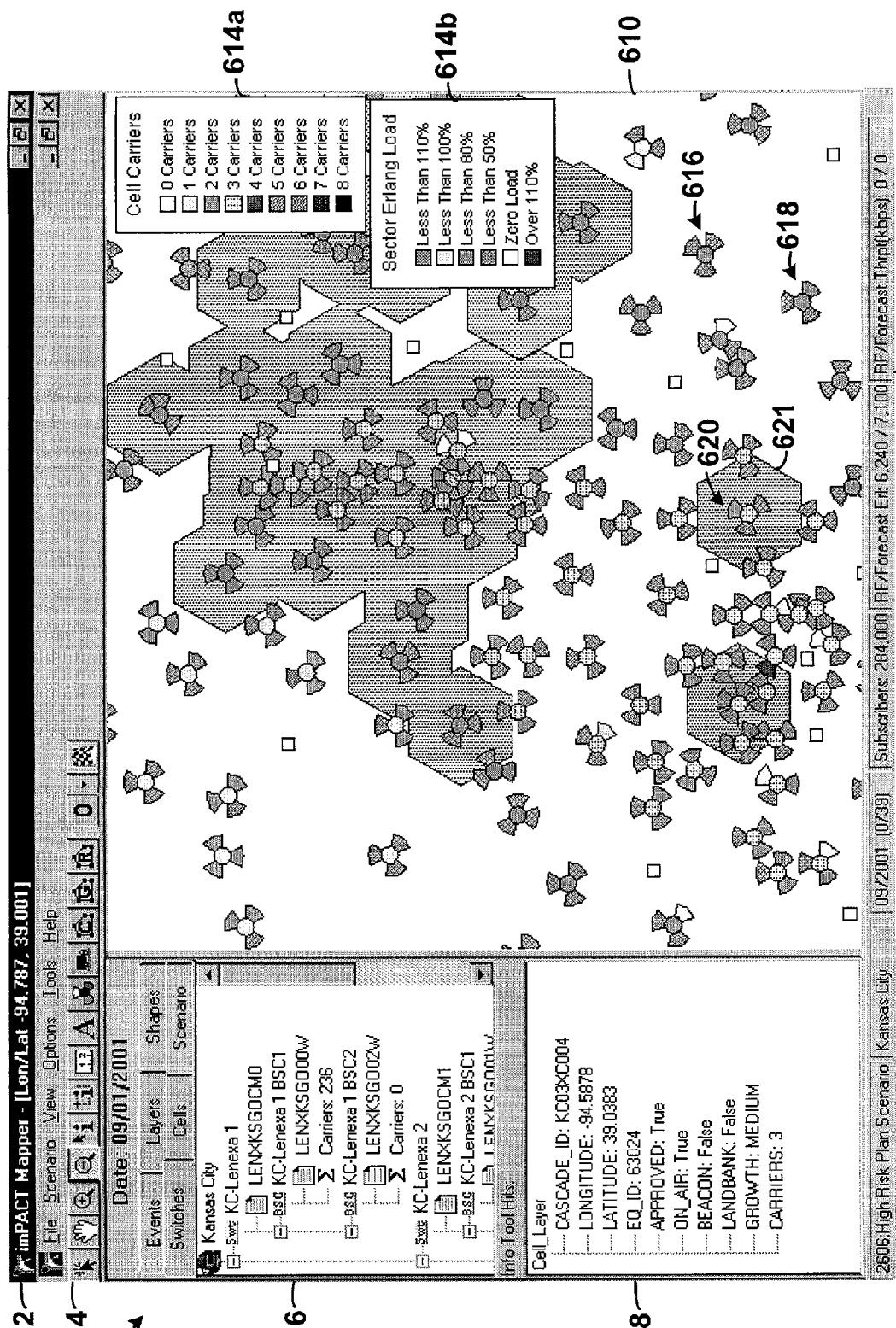
FIG. 6 illustrates one embodiment of a graphical representation of the wireless communication system of FIG. 1.

FIG. 6 illustrates one embodiment of a graphical representation 600 of the wireless communication system 100. The graphical representation 600 includes a title bar 602, a menu and tool bar 604, a file information window 606, a general information window 608, a design window 610, a status bar 612, and legends 614($a$–$b$). The title bar 602 may display a cursor location in longitude and latitude coordinates, as illustrated in FIG. 6, or the title bar 602 may display a zoom setting. The menu and tool bar 604 are similar to those found in Windows® based applications. The file information window 606 may have detailed information about components within the design window 610. For example, cell and switch information may be displayed within the file information window 606. The general information window 608 may have detailed information of the file information window 606. For example, as illustrated in FIG. 6, cell site layer information may be displayed including coordinates, cell labels, and current status of a cell site or BTS.

Design window 610 may display a graphical topology of a wireless communication system superimposed over a map (a map is not shown for ease of illustration). Design window 610 may be interactive, including applications such as zoom in and zoom out. Design window 610 includes multiple BTSs modeled using shapes and/or colors to indicate status. For example, as illustrated in the design window 610, BTSs 616, 618, and 620 are modeled with three pie shapes positioned around a circle. The pie shapes represent sectors and the circles represent a BTS. A coverage area may also be displayed for each BTS 616, 618, and 620. For example, BTS 620 is illustrated with coverage area 621 modeled as a hexagon.

The status bar 612 of the graphical representation 600 may display information such as a project name, a market name, data, an iteration number, as well as capacity and subscriber information. For instance, as illustrated in FIG. 6, expected Erlang traffic is displayed showing an RF forecast followed by a call model forecast (i.e., 6,240/7,100).

Legends 614(a–b) are further illustrated in FIG. 7. Each legend illustrates a status of subscriber load on a BTS. Legend 614a is a cell carrier legend. Each BTS illustrated in the design window 610, such as BTSs 616, 618 and 620, include cell carriers, such as 624, 626 and 628. Legend 614a depicts a number of carriers on an individual BTS using a color or shading scheme corresponding to the number of carriers. For example, as illustrated in FIG. 7, BTSs 616 and 618 have 1 carrier, while BTS 620 has 8 carriers. Legend 614b is a sector Erlang load legend. In addition to including cell carriers, each BTS in the design window 610 includes multiple sectors, such as 630–638 as shown in FIG. 7. Legend 614b depicts an Erlang traffic capacity percentage for each sector of each BTS using a color or shading scheme corresponding to the percentage. For example, as illustrated in FIG. 7, BTSs 616, 618, and 628 each have three sectors. BTSs 616 and 618 each have one sector with 110% Erlang load (i.e., 10% over capacity), and two sectors with less than 50% Erlang load (i.e., less than 50% capacity), while BTS 620 has two sectors with less than 100% Erlang load and one sector with zero load.

FIG. 8 illustrates an additional legend 700 that may be displayed within the general information window 608 of the graphical representation 600 illustrated in FIG. 6. Legend 700 indicates shapes that may be used to represent a cell carrier of a BTS. For example. each BTS 616, 618, and 620 includes cell carriers 624, 626, and 628 illustrated as circles which may represent approved or currently in use BTSs. Alternatively, a BTS may have a cell carrier illustrated as any one of the shapes of legend 700. The shapes indicate such status of a BTS as Approved/Not On-Air, Proposed, Future Cell Placeholder, Landbanked, Smart Antenna Sector, or Beacon Cell. Squares represent BTSs that are approved but not yet on-air, and stars represent proposed BTSs. Proposed and future cell placeholders are represented with a respective shaded star shape. Landbanked BTSs are represented with a star shaped cell carrier as well. A beacon cell, or a BTS which is enabled to broadcast information about surrounding cells, may be represented by a BTS superimposed over a shaded circle.

Additional graphical representations may be used that include more or less display information and more or less output information. The graphical representation 600 may be used in accordance with any wireless communication system, such as a time division multiple access (TDMA) system, a frequency division multiple access (FDMA) system, a code division multiple access system (CDMA) or others. Furthermore, the graphical representation 600 illustrated in FIG. 6, is not limited to wireless communication system applications. It can extend as well to other communication systems such as landline telephone systems or possibly data network systems such as the Internet.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications of structure, sequence and the like apparent to those skilled in the art would still fall within the scope of the invention.

We claim:

1. In a wireless communication system comprising a plurality of base stations each having a respective radiation pattern defining one or more sectors, a method of predicting future per-sector traffic in the wireless communication system comprising:
    receiving input indicative of current per-sector traffic;
    receiving input indicative of expected future market traffic;
    using the expected future market traffic to extrapolate from the current per-sector traffic to establish a measure of expected future per-sector traffic by a process comprising:
        (a) categorizing the sectors into groups based on growth rate of traffic in the sectors;
        (b) distributing the expected future market traffic among the groups based on the growth rates of the groups, to associate with each group a respective group-portion of the expected future market traffic; and
        (c) within each group, distributing the group's respective portion among the sectors in the group, to associate with each sector a respective sector-portion of the expected future market traffic; and
    outputting an indication of the expected future per-sector traffic, wherein outputting the indication of the expected future per-sector traffic comprises outputting an indication, with respect to each of at least some of the sectors, of the sector's respective sector-portion of the expected future market traffic.

2. A computer readable medium having stored therein instructions for causing a central processing unit to execute the method of claim 1.

3. The method of claim 1, wherein receiving input indicative of current per-sector traffic comprises receiving information that indicates, per-sector, a current amount of Erlang traffic, and a current amount of throughput traffic.

4. The method of claim 1, wherein receiving input indicative of expected future market traffic comprises receiving input, which indicates a total amount of traffic expected for the market on a future date.

5. The method of claim 4, wherein receiving input, which indicates the total amount of traffic comprises receiving one or more of an estimated amount of future Erlang traffic on the future date, and an estimated amount of future throughput traffic on the future date.

6. The method of claim 1 further comprising receiving input indicative of a distribution of per-sector traffic, wherein the distribution of per-sector traffic includes expected future per-sector growth levels.

7. The method of claim 6 further comprising using the input indicative of the distribution of per-sector traffic with the input indicative of expected future market traffic to extrapolate from the current per-sector traffic to establish the measure of expected future per-sector traffic.

8. The method of claim 6 further comprising computing an expected growth scaling factor according to the expected future per-sector growth levels, and using the expected growth scaling factor with the expected future market traffic to extrapolate from the current per-sector traffic to establish the measure of expected future per-sector traffic.

9. The method of claim 1, wherein to establish the measure of expected future per-sector traffic comprises establishing, per-sector, a respective level of expected future Erlang traffic and a respective level of expected future throughput traffic.

10. The method of claim 9, wherein outputting an indication of the expected future per-sector traffic comprises displaying a graphical representation of the expected future per-sector traffic, and wherein the graphical representation includes color-coded sectors according to the respective level of expected future per-sector Erlang traffic and the respective level of expected future per-sector throughput traffic.

11. The method of claim 9, wherein outputting an indication of the expected future per-sector traffic comprises outputting a table including information relating to the respective level of expected future per-sector Erlang traffic and the respective level of expected future per-sector throughput traffic.

12. The method of claim 1 further comprising selecting a future date, and wherein, to extrapolate from the current per-sector traffic to establish the measure of expected future per-sector traffic comprises establishing the measure of expected future per-sector traffic on the selected future date.

13. In a wireless communication system comprising a plurality of base stations each having a respective radiation pattern defining one or more sectors, a method of predicting future per-sector traffic in the wireless communication system comprising:
  receiving input indicative of current per-sector traffic;
  receiving input indicative of expected future market traffic;
  dividing the expected future market traffic into market-growth level groups;
  assigning each of the plurality of sectors into sector-growth level groups, wherein each sector growth level group defines a traffic growth rate, and wherein each sector-growth level group corresponds to one of the market-growth level groups;
  using the market-growth level groups, the sector-growth level groups, and the traffic growth rate to compute an expected growth scaling factor;
  applying the expected growth scaling factor to each of the sector-growth level groups to compute expected future growth rates for each of the sector-growth level groups;
  applying each of the expected future growth rates to the current per-sector traffic of each of the plurality of sectors to establish a measure of expected future per-sector traffic; and
  outputting an indication of the expected future per-sector traffic.

14. A system for identifying future capacity problems in a wireless communication system comprising a plurality of base stations each having a respective radiation pattern defining one or more sectors comprising:
  a processor;
  data storage; and
  machine language instructions stored in the data storage executable by the processor to perform functions including:
    receiving input indicative of current per-sector traffic for each sector defined by a base station within a wireless communication system;
    receiving input indicative of expected future market traffic, wherein a user inputs the input indicative of current per-sector traffic and the input indicative of expected future market traffic into the data storage;
    using the expected future market traffic to extrapolate from the current per-sector traffic to establish a measure of expected future per-sector traffic;
    receiving input indicative of future per-sector capacity;
    comparing the future per-sector capacity with the measure of expected future per-sector traffic to identify future capacity problems in the wireless communication system; and
    outputting an indication of the future capacity problems.

15. The system of claim 14 further comprising a computer screen to display a graphical representation of the indication of the future capacity problems.

16. In a wireless communication system comprising a plurality of base stations each having a respective radiation pattern defining one or more sectors, a method of identifying future capacity problems in the wireless communication system comprising:
  receiving input indicative of current per-sector traffic;
  receiving input indicative of expected future market traffic;
  using the expected future market traffic to extrapolate from the current per-sector traffic to establish a measure of expected future per-sector traffic, wherein, to establish the measure of expected future per-sector traffic comprises establishing future per-sector traffic loading;
  receiving input indicative of future per-sector capacity;
  comparing the future per-sector capacity with the measure of expected future per-sector traffic to identify future capacity problems in the wireless communication system; and
  outputting an indication of the future capacity problems.

17. The method of claim 16, wherein receiving input indicative of future per-sector capacity comprises receiving, per-sector, one or more inputs selected from the group consisting of number and type of users, an amount of expected future per-sector Erlang traffic, and an amount of expected future per-sector throughput traffic.

18. The method of claim 16, wherein comparing the future per-sector capacity with the measure of expected future per-sector traffic comprises comparing the future per-sector capacity with the future per-sector traffic loading.

19. The method of claim 16, wherein, to identify future capacity problems in the wireless communication system comprises identifying per-sector traffic overloading.

20. The method of claim 16, wherein outputting the indication of the future capacity problems comprises displaying a graphical representation of the per-sector traffic overloading.

* * * * *